(12) United States Patent
Hsieh et al.

(10) Patent No.: US 12,293,435 B2
(45) Date of Patent: May 6, 2025

(54) COLOR CHANGE OF INFORMATION ELEMENTS

(71) Applicant: Hewlett-Packard Development Company, L.P., Spring, TX (US)

(72) Inventors: Min-Yuan Hsieh, Taipei (TW); Po-Hsiang Huang, Taipei (TW); Hsiao-Yu Chiu, Taipei (TW); Ho-Chih Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 346 days.

(21) Appl. No.: 17/795,910

(22) PCT Filed: Mar. 11, 2020

(86) PCT No.: PCT/US2020/022157
§ 371 (c)(1),
(2) Date: Jul. 28, 2022

(87) PCT Pub. No.: WO2021/183126
PCT Pub. Date: Sep. 16, 2021

(65) Prior Publication Data
US 2023/0097911 A1    Mar. 30, 2023

(51) Int. Cl.
*G06T 11/00*    (2006.01)

(52) U.S. Cl.
CPC .................................. *G06T 11/001* (2013.01)

(58) Field of Classification Search
CPC ............. G06T 11/001; G09G 2340/12; G09G 2354/00; G09G 2360/16; G09G 5/02
See application file for complete search history.

(56) References Cited

U.S. PATENT DOCUMENTS

| | | | |
|---|---|---|---|
| 8,342,963 B2 | 1/2013 | Steiner et al. | |
| 8,834,245 B2 | 9/2014 | Haigh-Hutchinson | |
| 9,057,587 B2 | 6/2015 | Roman et al. | |
| 9,079,099 B1 | 7/2015 | Murphy et al. | |
| 9,269,157 B2* | 2/2016 | Saban | H04N 23/63 |
| 10,104,334 B2* | 10/2018 | Evans | G06T 5/90 |
| 10,118,097 B2* | 11/2018 | Stevens | A63F 13/52 |
| 10,902,567 B2* | 1/2021 | Mertens | H04N 5/20 |
| 11,145,096 B2* | 10/2021 | McHugh | G06F 3/012 |
| 2006/0158556 A1 | 7/2006 | Lyu | |
| 2006/0223637 A1 | 10/2006 | Rosenberg | |
| 2014/0362105 A1 | 12/2014 | Kocienda et al. | |
| 2016/0158641 A1 | 6/2016 | Summons et al. | |

FOREIGN PATENT DOCUMENTS

| | | |
|---|---|---|
| CN | 106873996 A | 6/2017 |
| JP | 07-203299 A | 8/1995 |
| WO | 2020/012546 A1 | 1/2020 |

* cited by examiner

*Primary Examiner* — Tom Y Lu
(74) *Attorney, Agent, or Firm* — Quarles & Brady LLP

(57) ABSTRACT

Techniques for color change of Information elements (IEs) are described. In an example, a color of the IE and a color of a region of a virtual environment surrounding the IE may be compared. Based on the comparison, it may be determined whether the IE is distinguishable from the region of the virtual environment. Further, based on the determination, the color of the IE may be changed to facilitate distinguishability of the IE.

16 Claims, 5 Drawing Sheets

COLOR CHANGE OF INFORMATION ELEMENTS

BACKGROUND

Information elements, such as pointers, counters, and the like, may be provided in virtual environments to provide information usable for interaction with the virtual environments, to provide information about the virtual environments, or both. For instance, a pointer indicates a current position of user interaction in a virtual environment. Such an indication can be used to select items, such as icons, on the virtual environment.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
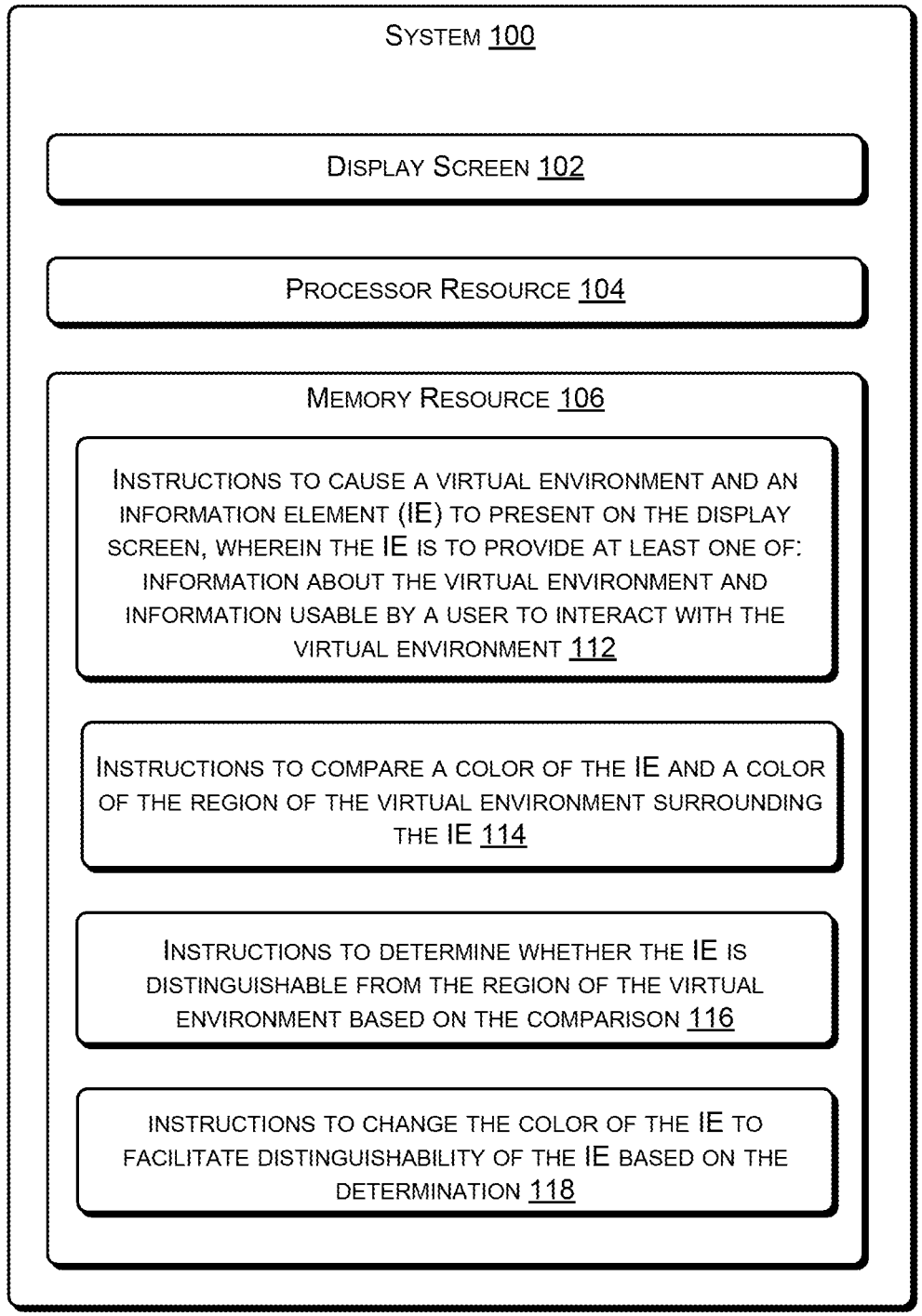
FIG. 1 illustrates a system for changing color of an Information element (IE) in a virtual environment, according to an example implementation of the present subject matter.

A user may utilize Information elements (IEs) to obtain information about the virtual environments, to obtain information that can be used to interact with the virtual environments or both. An IE may be a user interface (UI) element such as, for example, a crosshair and a frames per second (FPS) counter displayed in a gaming environment. As another example, in a simulation environment simulating a real-time trajectory of a missile, an on-screen trajectory map may indicate a position of the missile and a position of target. The on-screen trajectory map may be utilized to track whether the missile is in the right trajectory to hit a target.

A user of the virtual environment may have to visually recognize the IE in the virtual environment, for example, to perform various operations on the virtual environment. However, in some scenarios, the user may not be able to visually recognize the IE, for example, due to a similarity between a color of the IE and a color of the region surrounding the IE. In such scenarios, the experience of the user interacting with the virtual environment may be reduced, for example. The present subject matter relates to color change of information elements. With the implementation of the present subject matter, color of the IEs may be dynamically changed to visually recognize the IEs in the virtual environment.

In accordance with the present subject matter, a system may compare a color of an IE, such as a pointer, and a color of a region of a virtual environment surrounding the IE. The IE may be, for example, an on-screen display (OSD) element, which may be overlaid on images of the virtual environment. Based on the comparison, the system may determine the distinguishability of the IE from the region of the virtual environment. For instance, if the color of the region of the virtual environment surrounding the IE is similar to that of the IE, the system may determine that the IE is not distinguishable from the region of the virtual environment. The region of the virtual environment surrounding the IE may be referred to as a surrounding region. The surrounding region may be a region of the virtual environment which is displayed by pixels within a threshold distance from a pixel displaying the IE. If it is determined that the IE cannot be distinguished from the surrounding region, the system may change the color of the IE. For instance, if it is determined that the IE and the surrounding region are of the same color, the system may change the color of the IE. In an example, changing the color of the IE may involve changing the color of entire IE. In another example, changing the color of the IE may involve changing the color of a portion of the IE, such as the outline of the IE.

In an example, to determine the distinguishability, a numerical value corresponding to the color of the IE and a numerical value corresponding to the color of the surrounding region may be determined and compared. The numerical values may be, for example, numerical values of colors in a Red-Green-Blue (RGB) color space.

In an example, the surrounding region may have a plurality of colors. For instance, the plurality of pixels that is to display the surrounding region may display the plurality of colors. In such a case, to determine the distinguishability, the system may determine a numerical value corresponding to each pixel of the surrounding region and an average numerical value of the plurality of pixels. The average numerical value may then be compared with the first numerical value to determine the distinguishability. Further, the color of the IE may be changed based on the determination to improve the distinguishability of the IE from the surrounding region.

The present subject matter provides an efficient technique to enhance the experience of a user when interacting with virtual environments. Since the color of the IE is changed based on the color of the surrounding region, the present subject matter helps the user to continually recognize the IE, for example. The change of color of the IE based on the color of the surrounding region improves user experience in virtual environments, such as a gaming environment, where IEs, such as crosshairs, are to be moved frequently. Further, the present subject matter eliminates manual effort in changing the color of the IEs by dynamically changing the color of the IEs. For instance, the present subject matter eliminates the manual effort of changing a color of a crosshair in a gaming environment, which may have several colors, in which the IEs may be moved frequently, and in which the user may not have time to change the color of the crosshair manually.

The present subject matter is further described with reference to FIGS. 1-5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 100 for changing color of an Information element (IE) in a virtual environment, according to an example implementation of the present subject matter. The system 100 may be a computing device, which may provide the virtual environment to a user of the system 100. For example, the system 100 may be implemented as, for example, a laptop, a desktop, a tablet, a mobile phone, or the like.

The system 100 may include a display screen 102, a processor resource 104, and a memory resource 106. The display screen 102 may be, for example, a Liquid Crystal Display (LCD) display, a Light Emitting Diode (LED) display, or an organic-LED (OLED) display. The display screen 102 may display the IE (not shown in FIG. 1), and the virtual environment (not shown in FIG. 1).

The processor resource 104 may include, for example, a microprocessor, a microcomputer, a microcontroller, a digital signal processor, a state machine, a logic circuitry, or a device that manipulates signals based on operational instructions. In an example, the processor resource 104 may be part of a monitor scaler. The monitor scaler may in turn be part of a display device that also includes the display screen 102. In another example, the processor resource 104 may be a central processing unit (CPU) of the system 100.

The memory resource 106 may include any non-transitory computer-readable medium including volatile memory (e.g., RAM), and/or non-volatile memory (e.g., EPROM, flash memory, memristor, etc.). The memory resource 106 may also be an external memory unit, such as a flash drive, a compact disk drive, an external hard disk drive, or the like. The memory resource 106 may have instructions stored in it, which may be fetched, and executed by the processor resource 104.

The memory resource 106 may include instructions 112 that are executable by the processor resource 104 to cause the virtual environment (not shown in FIG. 1), and the IE (not shown in FIG. 1) to be presented on the display screen 102. The IE may be an element that may provide information about the virtual environment, may provide information usable for interaction with the virtual environment, or both. In an example, the IE may be an element of the Graphic User Interface (GUI) that may be used to interact with other elements of the GUI, such as icons, buttons, and the like. The IE may be overlaid on the other elements of the GUI. In an example, the monitor scaler may include an On-screen display (OSD) unit (not shown in FIG. 1). The OSD unit may render OSD elements, such as the IEs, on the display screen 102. The monitor scaler may receive a source data corresponding to the virtual environment, such as an image or a scene of the virtual environment and render the virtual environment on the display screen 102. In addition, the IE may be overlaid on the virtual environment.

In an example, the virtual environment may be a gaming environment, and the IE may be a crosshair or an in-game counter, such as a game statistics counter and a frame per second counter. In another example, the virtual environment may be an interactive learning environment, and the IE may be a pointer, which may indicate a current position of user interaction in the interactive learning environment and may be used to select options displayed in the interactive learning environment.

The memory resource 106 may include instructions 114 that are executable by the processor resource 104 to compare a color of the IE and a color of a region of the virtual environment surrounding the IE (not shown in FIG. 1). The region of the virtual environment surrounding the IE may be referred to as surrounding region. The surrounding region may be a region of the virtual environment which is displayed by a plurality of pixels that are within a threshold distance from a pixel displaying the IE.

The memory resource 106 may include instructions 116 that are executable by the processor resource 104 to determine whether the IE is distinguishable from the surrounding region based on the comparison. For instance, if the color of the IE is the same as that of the surrounding region, it may be determined that the IE is not distinguishable from the surrounding region. In an example, to determine the distinguishability of the IE and the color of the surrounding region, a numerical value corresponding to the color of the IE, and a numerical value corresponding to the color of the surrounding region may be determined and compared. The numerical values may be, for example, numerical values of colors in a Red-Green-Blue (RGB) color space. In an example, to determine the distinguishability, a difference between the numerical value corresponding to the color of the IE, and the numerical value corresponding to the color of the surrounding region may be determined and compared with a threshold difference. If the color difference is lesser than the threshold difference, it may be determined that the IE is not distinguishable from the surrounding region. For example, the IE may have a red color, which may have a corresponding numerical value of (255, 0, 0), and the surrounding region may have a maroon color, which may have a corresponding numerical value of (128, 0, 0). In such a case, a numerical difference between the color of the IE and that of the surrounding region may be 127. If the threshold difference is 221, it may be determined that the color difference is less than threshold difference. In an example, the color difference may be a Euclidean distance between the numerical value corresponding to the color of the IE and the numerical value corresponding to the color of the surrounding region.

The memory resource 106 may include instructions 118 that are executable by the processor resource 104 to change the color of the IE based on the determination. For instance, if it is determined that the Euclidean Distance between the numerical value corresponding to the color of the IE and the numerical value corresponding to the surrounding region is less than the threshold difference, the color of the IE may be changed. In an example, the color of a portion of the IE, such as an outline of the IE, may be changed.

As mentioned above, if the color of the IE is similar to that of the surrounding region, the color of the IE is changed. This may facilitate distinguishability of the IE from the surrounding region. Therefore, the user may be assisted by the color change to continually recognize the location of the IE, the status of the IE, and/or the shape of the IE. Accordingly, in a virtual environment, such as a gaming environment, the present subject matter may facilitate continued recognition of the IEs, such as crosshairs, in-game counters, and the like.

Figure 2:
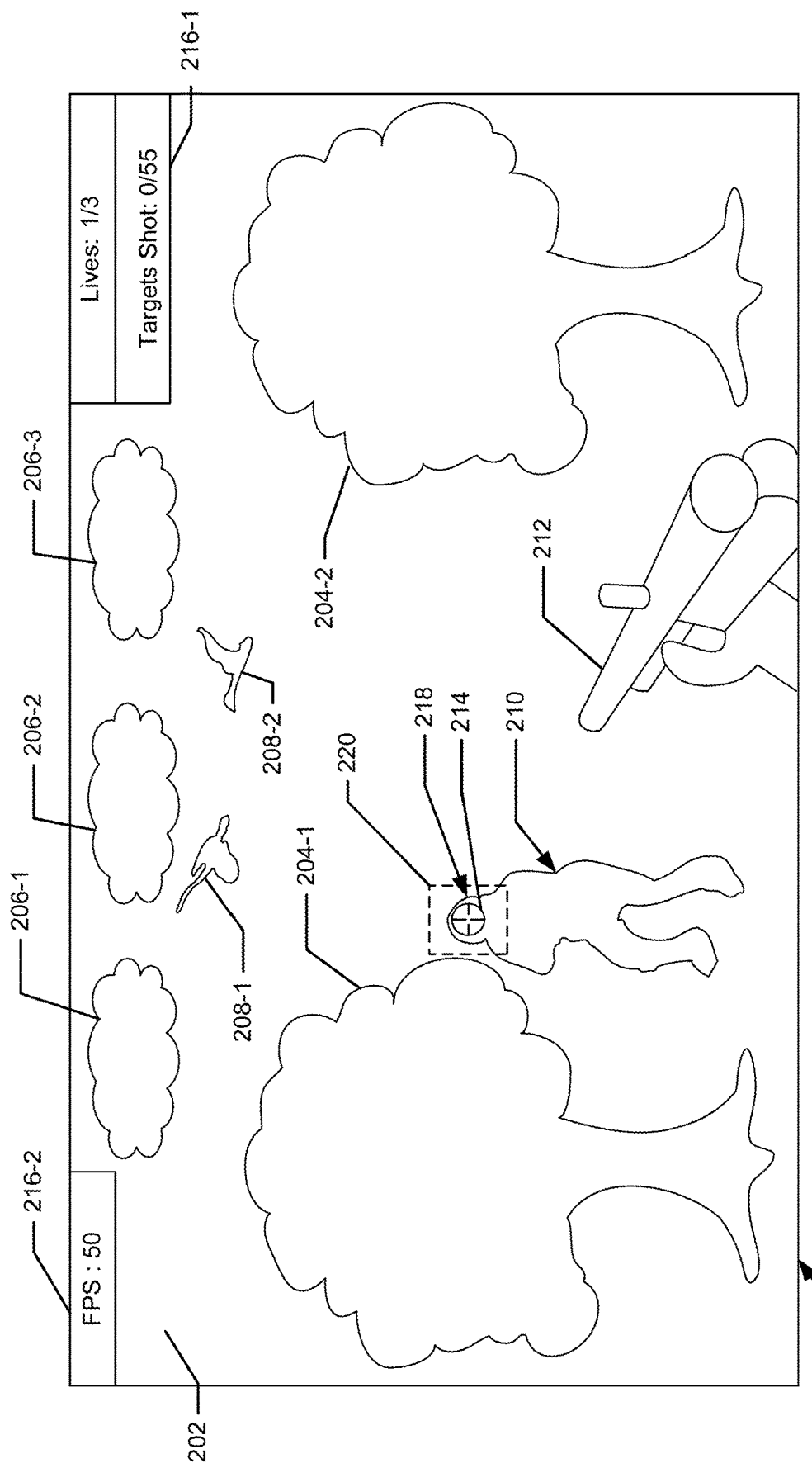
FIG. 2 illustrates a gaming environment in which color of an IE is changed, according to an example implementation of the present subject matter.

FIG. 2 illustrates a gaming environment 202 in which a color of an IE is changed, according to an example implementation of the present subject matter. The gaming environment 202 may be, for example, part of a first-person shooting game. The gaming environment 202 may include a plurality of objects and a plurality of IEs.

The objects of the gaming environment 202 may be a visual representation of real-world entities. The objects may include, for example, trees 204-1 and 204-2, clouds 206-1-206-3, birds 208-1 and 208-2, a person 210, and a gun 212.

In an example, the objects of the gaming environment 202 may be of different colors. For instance, the clouds 206-1-206-3 may be white-colored, branches of the trees 204-1 and 204-2 may be green-colored, and a color of the person 210 may be black. Objects may generally include a variety of colors, patterns, and textures, represented by RGB tuples, for example.

The IEs may include a crosshair 214 and in-game counters, such as a game statistics counter 216-1 and a frame-per-second (FPS) counter 216-2. The crosshair 214 may indicate an aiming point of the gun 212 and may be utilized to point at a target region 218 in the gaming environment 202. The target region 218 may be a region of the gaming environment 202 that is to be aimed at by a user of the gaming environment 202, for example, for shooting. The target region 218 may be, for example, a head of the person 210.

The game statistics counter 216-1 may provide statistics of gameplay, such as the number of lives remaining for a player in the gameplay, the number of targets shot in the gameplay, and the like. The FPS counter 216-2 may indicate the number of frames of the gaming environment 202 displayed by the display screen 102 per second. Higher the number of frames provided per second, faster will be responses to an input in the gaming environment 202, and better would be the gaming experience.

The display screen 102 may include a plurality of pixels. The color and intensity of the pixels of the display screen 102 may be controlled by the system 100 to display the objects and the IEs of the gaming environment 202. As an example, pixels in a region of the display screen 102 that is to display the tree 204-1 may be controlled to display green color. For instance, to control the color displayed by the pixel, the monitor scaler (not shown in FIG. 2) may control the numerical values of the color. That is, to display green color (numerical value of 0, 128, 0) at a pixel, the monitor scaler may control the pixel data to display (0, 128,0) by causing the display screen 102 to emit light via the green subpixel at that location, for example. In an example, to display the objects and the IEs, the monitor scaler may receive a source data corresponding to the content to be displayed. The source data may be, for example, an image data or a video data of the gaming environment 202 and may be received from the operating system of the system 100. The source data may be received in the form of an input signal, such as a Video Graphics array (VGA) signal, High-definition Multimedia Interface (HDMI) Signal, or the like. The monitor scaler may process the source data and transform the source data into an electrical signal that is compatible with the resolution of the display screen 102. Further, the OSD unit of the monitor scaler may cause the appearance of overlaid OSD elements on the images to be displayed on the display screen 102 by exchanging the source data for a particular group of pixels with image data associated with displaying the OSD elements. The OSD elements may include, for example, the IEs. The monitor scaler may supply the electrical signal to a timing controller (T-CON) board (not shown in FIG. 2) of the display device. The T-CON board may convert the electrical signal and drive the plurality of pixels of the display screen 102 to display the source data. In that example, the monitor scaler may exchange the default IE color with a distinguishable color at a particular pixel location based on the source data at the relative location of that particular pixel, such that T-CON converts the electrical signal associated with the distinguishable color rather than the indistinguishable color for the pixel location of the IE. In other examples, the color and the intensity of the pixels may be controlled by a graphics card integrated with the system 100, an external graphics card, or the like.

In the gaming environment 202, the user playing the shooting game may provide inputs using, for example, a mouse or a keyboard or a joystick, to move the crosshair 214 to point at the target region 218. For instance, if the person 210 moves in a left-hand side direction from a center of the display screen 102 towards the tree 204-1, the user may move the gun 212 in the left-hand side direction such that the crosshair 214 is positioned on the target region 218. Upon pointing at the target region 218, the user may provide an input to shoot the target region 218 with the gun 212.

As the crosshair 214 is being moved in the gaming environment 202, the crosshair 214 may overlap with a region of the gaming environment 202 having the same or similar color as that of the crosshair 214. In an example, the determination that the color of the crosshair 214 is same as or similar to that of the region of the gaming environment 202 may be performed based on a threshold difference, as will be explained later. For instance, consider that the target region 218 is moving in a left-hand side direction from the center of the display screen 102 towards the tree 204-1 crosshair to aim at the target region 218 and consider that the crosshair 214 is moved past the target region 218 such that the crosshair 214 overlaps with the tree 204-1. If the color of the crosshair 214 is green, the crosshair 214 may not be recognizable, since the region of the gaming environment 202 is part of the green-colored tree 204-1. In another example, consider that the crosshair 214 is being positioned in front of the target region 218. If the crosshair 214 is of black color, the crosshair 214 may not be recognizable, as the target region 218 has the same color as that of the crosshair 214. Further, the in-game counters 216-1 and 216-2 may also become unrecognizable due to changes in the gaming environment 202. For instance, consider that a leftmost region of the display screen may display the cloud 206-2. In such a case, the FPS counter 216-2 may overlap with the cloud 206-2. If the FPS counter 216-2 is of white color, i.e., same color as the cloud 206-2, the FPS counter 216-2 may become unrecognizable. Accordingly, the user may lose track of the IEs and may not recognize the IEs in the gaming environment 202.

To maintain recognizability of the IE, a processor resource, such as the processor resource 104 of FIG. 1, may monitor the IE and determine whether the IE can be distinguished from the region of the gaming environment 202 that overlaps with and surrounds the IE. The region of the gaming environment 202 that overlaps with and surrounds the IE may be referred to as the surrounding region. For instance, in FIG. 2, the crosshair 214 is illustrated to be positioned in front of the head. The region 220 surrounding the crosshair 214 may be identified by the processor resource 104 as the surrounding region based on a threshold distance. For instance, a plurality of pixels of the display screen 102 surrounding the pixel that are within a threshold distance from the pixel that displays the crosshair 214 may be identified by the system 100. The region that is displayed by the identified pixels may be identified as the surrounding region 220. The identified pixels, which display the surrounding region 220, may be referred to as a first plurality of pixels. The first plurality of pixels may vary depending on movement of the IE, as the surrounding region 220 varies with the movement of the IE. For instance, when the crosshair 214 overlaps with the tree 204-1, the surrounding region 220 may be part of the tree 204-1. Accordingly, the first plurality of pixels may be a subset of the pixels that displays the tree 204-1. Similarly, when the crosshair 214 overlaps with the cloud 206-2, the surrounding region may be part of the cloud 206-2. Accordingly, the first plurality of pixels may be a subset of pixels that displays the cloud 206-2.

In an example, the surrounding region 220 may have a plurality of colors. The colors of the surrounding region 220 may be collectively referred to as a first plurality of colors. In such an example, the system 100 may determine the distinguishability by comparing the color of the crosshair 214 with the first plurality of colors. To determine the distinguishability of the crosshair 214 from the surrounding region 220, a numerical value corresponding to the color of the crosshair 214, and numerical values corresponding to the first plurality of pixels may be determined and compared. For instance, the system 100 may determine a first numerical value that corresponds to the color of the crosshair 214. Further, a numerical value corresponding to each pixel of the first plurality of pixels may be determined. The numerical values corresponding to the pixels of the surrounding region 220 may be referred to as a first plurality of numerical values. To determine the distinguishability of the crosshair 214 from the surrounding region 220, a difference between the first numerical value and an average numerical value of the first plurality of numerical values may be determined. Based on the difference, the color of the crosshair 214 may be changed. For instance, if the difference is less than a threshold difference, the color of the crosshair 214 may be changed. In an example, the monitor scaler may determine the color of the pixels that display the surrounding region 220 and the color of the pixels displaying the IE based on the interaction with a source that provides the source data (which may be the operating system), the T-CON board, or both. The color may be used by the monitor scaler to determine the first numerical value and the first plurality of numerical values for determination of the difference. The numerical values of colors, the comparison of the numerical values, and a change in the color of the crosshair will be described in greater detail with reference to FIG. 3. In some examples, some of the functions explained as being performed by the monitor scaler, such as the determination of the first numerical value and the first plurality of numerical values, may be performed by the CPU. Although, the gaming environment 202 is explained with reference to a shooting game, the present subject matter can be utilized with other types of gaming environments, such as a racing game. The present subject matter may be implemented in other types of virtual environments, such as an interactive learning environment, as will be described in detail below.

Figure 3:
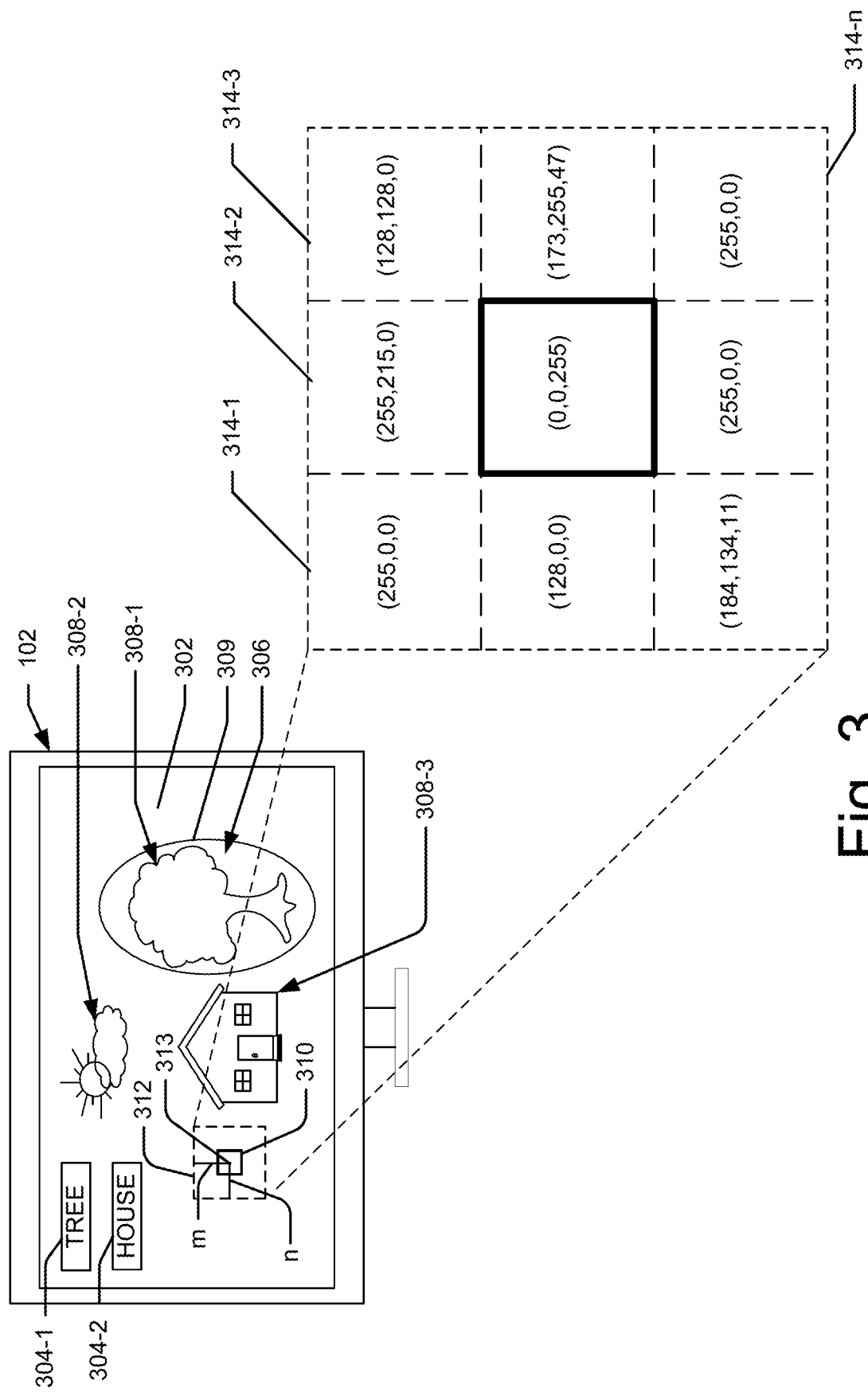
FIG. 3 illustrates a virtual environment in which a color of an IE is changed, according to an example implementation of the present subject matter.

FIG. 3 illustrates a virtual environment 302 in which a color of an IE is changed, according to an example implementation of the present subject matter. The virtual environment 302 may be displayed on the display screen 102 and may be, for example, an interactive learning environment.

The virtual environment 302 may include a plurality of buttons 304-1, 304-2, and a plurality of objects, such as a tree 308-1, a cloud 308-2, and a house 308-3. Each button may include a name of an object. In the virtual environment 302, an object may be highlighted by a highlighter 309. Based on the highlighted object, a user may have to select a button, which may include the name of the highlighted object. For instance, if the tree 308-1 is highlighted, the user may have to select a virtual button that includes the word "tree".

As mentioned earlier, the display screen 102 may include a plurality of pixels. The plurality of pixels of the display screen 102 may be referred to as a second plurality of pixels and may be utilized for providing images of the virtual environment 302. In an example, the virtual environment 302 may include an IE, such as the pointer 310. Although the pointer 310 is shown as square-shaped, the pointer 310 may be of a different shape, such as an arrow shape or a circular shape. The pointer 310 may indicate current position of user interaction in the virtual environment and may be moved on the virtual environment 302, for example, to select virtual buttons 304-1 and 304-2. For instance, when an object is highlighted in the virtual environment 302, the pointer 310 may be moved to select a virtual button that includes the name of the highlighted object. As will be understood, the pointer 310 may be displayed on the display screen 102 by a pixel or a combination of pixels of the display screen 102. As will be understood, the pixel(s) that displays the pointer 310 change based on movement of the pointer 310 on the display screen 102. A pixel that displays the pointer 310 may be referred to as a first pixel. The use of the words "first", "second" along with the word "pixel" or "pixels" is for reference purposes and does not refer to an ordering of the pixels.

As the pointer 310 is being moved in the virtual environment 302, the pointer 310 may not be recognizable if a color of the pointer 310 is the same as that of a region 312 surrounding the pointer 310. The region 312 of the virtual environment 302 surrounding the pointer 310 may be referred to as a surrounding region of the pointer 310.

As mentioned earlier, the surrounding region 312 may be a region displayed by the pixels within a threshold distance from the first pixel. In an example, the monitor scaler (not shown in FIG. 3) may determine a position of the first pixel based on an interaction with the T-CON board (not shown in FIG. 3). For instance, the monitor scaler may determine an (x, y) co-ordinate position of the first pixel on the display screen 102. Based on the position of the first pixel, the surrounding region 312 may be identified by the monitor scaler. To identify the surrounding region 312, pixels that are within the threshold distance from the first pixel may be identified by the monitor scaler. If the pointer 310 is displayed by a plurality of pixels, in an example, the first pixel may be a pixel displaying a center of the pointer 310. For instance, pixels that are within a distance of 'n' units from a center point 313 of pointer 310 in a left-hand side direction, pixels within a distance of 'n' units from the center point 313 in a right-hand side direction, pixels within a distance of 'm' units from the center point 313 in a top direction, and pixels within a distance of 'm' units from the center point 313 in a bottom direction may be identified by the monitor scaler. The region displayed by the identified pixels may be identified by the monitor scaler as the surrounding region 312. Accordingly, the surrounding region 312 may be a rectangle having a length of 2n units and a width 2m units. In an example, the value of 'm' and 'n' may be selected depending on a size of surrounding region 312 from which the pointer 310 is to be clearly distinguishable. The values of 'm' and 'n' may be pre-configured in the system 100.

As mentioned earlier, the surrounding region 312 may vary dynamically based on a change in position of the pointer 310. In an example, a shape of the surrounding region 312 may change depending on the position of the pointer 310. For instance, if the pointer 310 is positioned near an edge of the display screen 102, the surrounding region 312 may be a sector-shaped region surrounding the pointer 310 with an arc of the sector at a threshold distance of from the central point of the pointer 310.

As explained earlier, the surrounding region 312 may have a plurality of colors. For instance, the surrounding region 312 may include a plurality of sub-regions 314-1, 314-2, 314-3, ..., 314-n, each having a different color. For example, the sub-region 314-1 may have a red color, a sub-region 314-2 may have a green color, and so on. The colors of the surrounding region 312 may be collectively referred to as the first plurality of colors. A plurality of pixels of the display screen 102, also referred to as the first plurality of pixels, may be controlled to display the first plurality of colors. In an example, each pixel may include a plurality of subpixels, such as a red subpixel, a blue subpixel, and a green subpixel. The subpixels of each pixel may be controlled to display the first plurality of colors. For instance, to display a red color in the sub-region 314-1, the red subpixels of the pixels that are to display the sub-region 314-1 may be controlled to emit light.

In an example, to facilitate recognizability of the pointer 310 regardless of its position on the display screen 102, the system 100 may determine whether the pointer 310 is distinguishable from the surrounding region 312, based on the color of the pointer 310, and the first plurality of colors. For instance, the color of the pointer 310, and the first plurality of colors may be compared with each other to determine the distinguishability.

In this regard, a first numerical value corresponding to the color of the pointer 310, and a numerical value corresponding to each of the first plurality of pixels may be determined. The numerical values corresponding to the first plurality of pixels may be collectively referred to as the first plurality of numerical values.

In an example, the first numerical value, and the first plurality of numerical values may be values of the color of the pointer 310, and of the first plurality of colors defined in a Red-Green-Blue (RGB) color space respectively. A color defined in the RGB color space may include a red component, a green component, and a blue component and may be represented as (red component, blue component, green component). Accordingly, the first numerical value may include a first red component, a first green component, and a first blue component. As an example, if the color of the pointer 310 is blue, the first numerical value may be (0, 0, 255).

Further, since the surrounding region 312 has a plurality of colors as explained above, the system 100 may determine an average color of the surrounding region 312 for comparison with color of the pointer 310. The average color may be a color corresponding to an average numerical value of the first plurality of numerical values. Accordingly, in an example, to compare the color of the pointer 310, and the average color of the surrounding region 312, the average numerical value may be determined. The average numerical value may include an average numerical value of red components of the first plurality of numerical values, an average numerical value of green components of the first plurality of numerical values, and an average numerical value of blue components of the first plurality of numerical values. For instance, the average numerical value of the first plurality of pixels depicted herein may be (181, 82, 34). The color corresponding to (181, 82, 34) value in the RGB color space may be dark muted red, which is the average color of the first plurality of colors. The average numerical value of red components of the first plurality of numerical values may be referred to as the second red component, the average numerical value of blue components of the first plurality of numerical values may be referred to as the second blue component, an average numerical value of green components of the first plurality of numerical values may be referred to as the second green component.

To compare the color of the pointer 310, and the first plurality of colors, a difference between the first numerical value, and the average numerical value may be determined. In an example, the difference between the first numerical value and the average numerical value may be determined based on a Euclidean distance (referred to as first Euclidean distance) between the first numerical value and the average numerical value. Euclidean distance may refer to a straight-line distance between two points in a Euclidean Space, such as a one-dimensional space, two-dimensional space or a three-dimensional space. The Euclidean distance between two points in a three-dimensional space $(x_1, y_1, z_1)$ and $(x_2, y_2, z_2)$ may be determined based on the below equation:

$$\text{Euclidean Distance} = \sqrt{(x_1-x_2)^2+(y_1-y_2)^2+(z_1-z_2)^2} \quad (1)$$

Accordingly, the first Euclidean distance, between the color coordinates (R1, G1, B1) corresponding to the pointer and color coordinates (R2, B2, G2) of the average color may be determined by using mathematical equation given below:

$$\text{First Euclidean Distance} = \sqrt{(R_1-R_2)^2+(G_1-G_2)^2+(B_1-B_2)^2} \quad (2)$$

Here $R_1$, $G_1$, $B_1$ refers to the first red component, the first green component, and the first blue component, and $R_2$, $G_2$, $B_2$ refers to the second red component, the second green component, and the second blue component. The first Euclidean distance may indicate the difference between the color of the pointer 310 and the average color. From the equation (2), it may be noted that to determine the difference between the first numerical value and the average numerical value, a difference between the first red component and the second red component, a difference between the first green component and the second green component, a difference between the first blue component and the second blue component may be determined. For instance, consider that the first numerical value corresponding to a maroon-colored pointer 310 is (128,0,0), and the average numerical value is (181, 82, 34). The first Euclidean distance, as determined using the equation (2), is 103.

In another example, the first Euclidean distance may be computed based on correction factors that weigh-in human perception of colors. In such an example, the first Euclidean distance may be determined using the below equations:

$$\bar{r} = \frac{(R_1 + R_2)}{2} \quad (3)$$

$$\text{First Euclidean Distance} = \sqrt{\left(\left(2+\frac{\bar{r}}{256}\right)*(R_1-R_2)^2\right)+\left(4*(G_1-G_2)^2\right)+\left(\left(2+\frac{255-\bar{r}}{256}\right)*(B_1-B_2)^2\right)} \quad (4)$$

For instance, consider that the first numerical value corresponding to a maroon-colored pointer 310 is (128,0,0), and the average numerical value is (181, 82, 34). The first Euclidean distance, as determined from the equation (4), is 340.

In an example, the first Euclidean distance may be compared with a threshold difference to ensure that the pointer 310 clearly distinguishable from the surrounding region 312. For instance, consider that the color of the pointer 310 is maroon, and the average color of the surrounding region 312 is dark muted red. Although the color of the pointer 310 and the color of the surrounding region 312 are different, the pointer 310 may not be clearly distinguishable to the user, since the colors of the pointer 310, and the surrounding region 312 are of similar shade. Accordingly, in such an example, to facilitate the distinguishability of the pointer 310, the system 100 may compare the first Euclidean distance with the threshold difference. If the first Euclidean distance is less than the threshold difference, the system 100 may determine that the color of the pointer 310 is to be changed to improve its distinguishability. Consider that the pointer 310 is of maroon color, and the average color of the surrounding region 312, which corresponds to the average numerical value, is dark-muted red. Further, consider that the threshold difference value is 221. The first Euclidean distance between the first numerical value, and the average numerical value may be determined as 103. In such a case, the system 100 may determine that the color of the pointer 310 is to be changed to improve its distinguishability, since the first Euclidean distance is less than the threshold difference.

The threshold difference may be selected as a fraction of a maximum possible Euclidean distance in the RGB color space. In an example, in the RGB color space, a maximum possible Euclidean distance between two pixels is 442, which is the Euclidean distance between a black-colored pixel and a white-colored pixel, as determined from the equation (1). The threshold difference may be in the range of 0.3-0.5 times maximum possible Euclidean distance. For instance, the threshold difference is 0.5 times the maximum possible Euclidean distance, which is of value 221. However, in another example, the maximum possible Euclidean distance between the black-colored pixel and the white-colored pixel is 764, as determined by equation (4). In such an example, the threshold difference may be of value 382.

Upon determining that the pointer 310 is not distinguishable, the system 100 may change the color of the pointer 310. In an example, changing the color of the pointer 310 may involve changing the color of entire pointer 310. In another example, changing the color of the pointer 310 may involve changing the color of a portion of the pointer 310, such an outline of the pointer 310. In an example, the color of the pointer 310 may be changed to a color of a second plurality of colors. The second plurality of colors may be, for example, colors supported by the display screen 102.

To facilitate distinguishability of the pointer 310 of the pointer 310 from the surrounding region 312 irrespective of its position in the display screen 102, the color of the pointer 310 may have to be of a color that is in contrast to the first plurality of colors. For instance, if the average color of the surrounding region 312 is dark muted red, the pointer 310 may be distinguishable, if the color of the pointer 310 is azure. Accordingly, the system 100 may select a color to which the pointer 310 is to be changed. The system 100 may select a color of the second plurality of colors that has a Euclidean distance greater than the threshold difference from the average color. As an example, if the average color is dark muted red, a color having a Euclidean distance greater than the value of 221 may be selected as the color of the pointer 310.

To determine the color having the Euclidean distance greater than the threshold difference, numerical values corresponding to the second plurality of colors defined in the RGB space may be determined. The numerical values corresponding to the second plurality of colors may be referred to as second plurality of numerical values. A Euclidean distance between the average numerical value, and each of the second plurality of numerical values may be determined and may be collectively referred to as the plurality of Euclidean distances. For instance, consider that the average numerical value is (181,82,35) and the threshold difference is 221. Accordingly, the system 100 may select blue as the color of the pointer 310, as blue has a Euclidean distance of 296 from the average numerical value.

In an example, the pointer 310 may be easily distinguishable if the color of the pointer 310 is of maximum contrast with that of the first plurality of colors. In particular, if the color of the pointer 310 is of maximum contrast with that of the average color, the pointer 310 may be easily distinguishable from the surrounding region 312. In this regard, in an example, a color of the second plurality of colors having a highest Euclidean distance from the average color may be selected as the color of the pointer 310. The highest Euclidean distance indicates that the corresponding color is of maximum contrast with the average color, and thereby, the color may be easily distinguishable from the first plurality of colors of the surrounding region 312. For instance, if the average color is dark muted red, a highest Euclidean distance may be corresponding to cyan, whose value is (0, 255, 255). Hence, cyan may be selected as the color of the pointer 310. Accordingly, the color of the pointer 310 may be changed to the selected color. In an example, the color selected may be any color having a Euclidean distance greater than the threshold difference from the average numerical value.

In an example, to change the color of the pointer 310 to a color that is in contrast with the average color of the surrounding region 320, the system 100 may utilize a look-up table. The look-up table may be stored, for example, in the memory resource 106 of the system 100. The look-up table may specify various colors and contrasting color corresponding to each color specified. Upon determination that the color of the pointer 310 is not distinguishable from the average color of the surrounding region 312, such as based on the first Euclidean distance and the threshold difference, the system 100 may utilize the look-up table to identify a contrasting color corresponding to the average color. The system 100 may then change the color of the pointer to the contrasting color. For instance, consider that the color of the pointer 310 is maroon and the average color of the surrounding region 312 is dark-muted red. Consider also that the color corresponding to dark-muted red color in the look-up table is cyan. Accordingly, the system 100 may change the color of the pointer 310 to cyan.

The comparison of color of the pointer 310, and the color of the surrounding region 312, and consequent change of color of the pointer 310 may be performed continually, for example, as the pointer 310 is being navigated on the display screen 102. For instance, the surrounding region 312 may be selected dynamically, based on a position of the pointer 310. Upon selection of the surrounding region 312, the color of the pointer 310 and the color of the surrounding region 312 may be compared, and the color of the pointer 310 may be changed to a contrasting color based on the comparison, as mentioned earlier. Therefore, the pointer 310 remains distinguishable from the surrounding region 312 continually. Accordingly, in virtual environments, such as gaming environments, where IEs, such as a crosshair, moves across the screen quickly, the present subject matter facilitates continuous recognition of the crosshair.

In the above examples, the first pixel, which is a reference pixel based on which the surrounding region is identified, is explained as a pixel displaying the center of the pointer 310. However, in an example, the first pixel may be a pixel displaying an edge of the pointer 310 or another portion of the pointer 310. Further, the first pixel may change depending on the shape of the pointer 310. Further, the first pixel may change depending on the type of the IE. For instance, if the IE is the crosshair 214, the first pixel may be a pixel displaying an intersecting point of the vertical line and the horizontal line of the crosshair 214. Although, in the above examples, various functions are explained as being performed by the monitor scaler, in some example, at least some of those functions may be performed by another component of the system 100, such as the CPU.

Figure 4:
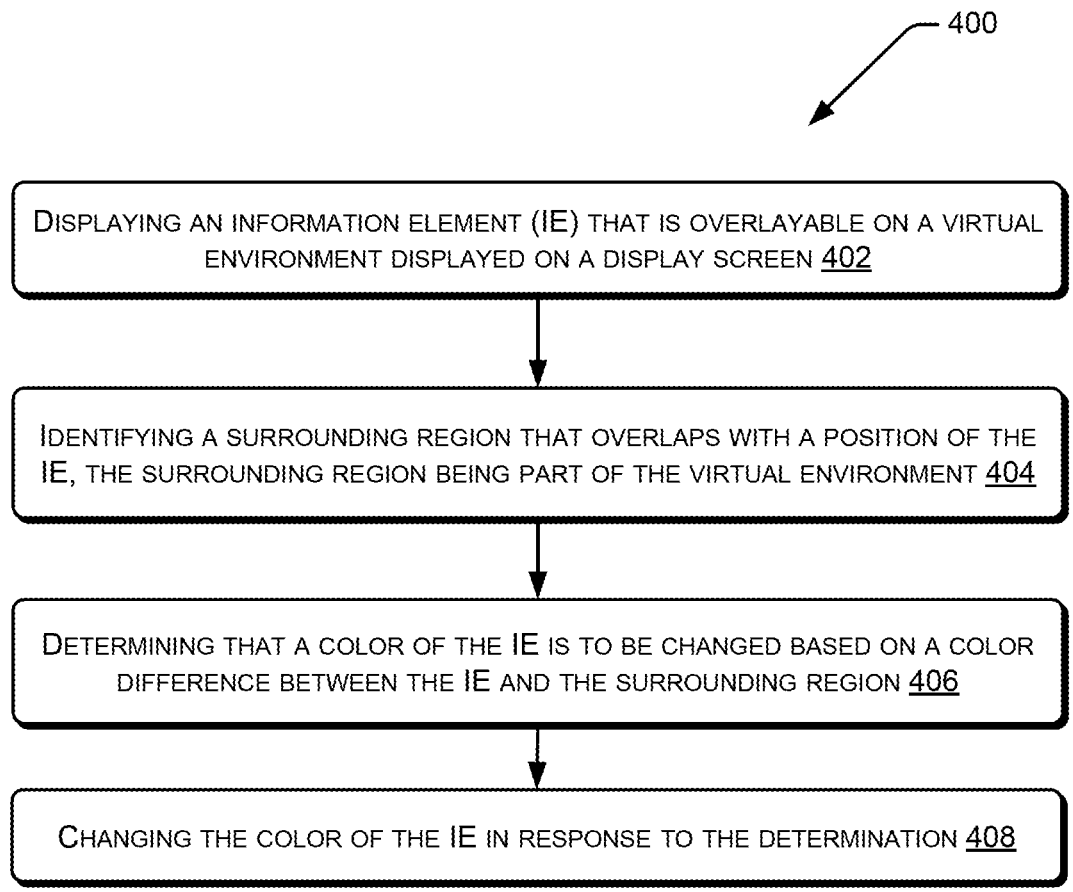
FIG. 4 illustrates a method for changing color of an IE in a virtual environment, according to an example implementation of the present subject matter.

FIG. 4 illustrates a method 400 for changing color of an IE in a virtual environment, according to an example implementation of the present subject matter.

The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that the method 400 may be performed by programmed computing devices and may be executed based on instructions stored in a non-transitory computer-readable medium. The non-transitory computer-readable medium may include, for example, digital memories, magnetic storage media, such as magnetic disks and magnetic tapes, hard drives, or optically readable digital data storage media.

At block 402, an IE that can be overlaid on a virtual environment may be displayed on a display screen. The IE may be displayed by a pixel of the display screen. The pixel of the display screen that is to display the IE may be referred to as the first pixel. The virtual environment may correspond to the gaming environment 202 or the virtual environment 302. The display screen may correspond to the display screen 102. The IE may correspond to the IE, such as the crosshair 214, in-game counters 216-1, 216-2 or the pointer 310.

At block 404, a surrounding region that overlaps with a position of the IE is identified. Accordingly, the surrounding region may be part of the virtual environment. In an example, the surrounding region may surround the IE. Accordingly, a size of the surrounding region may depend on a size of the IE. For instance, the size of the surrounding region may be greater than the size of the IE. Further, the surrounding region may vary dynamically based on position of the IE. The surrounding region may correspond to the surrounding region 220 or the surrounding region 312.

In an example, a plurality of pixels of the display screen within a threshold distance from the first pixel may be identified. Further, a region displayed by the identified plurality of pixels may be identified as the surrounding region. The pixels of the display screen that display the surrounding region may be referred to as a first plurality of pixels. The surrounding region may have a plurality of colors, which may be displayed by controlling the first plurality of pixels of the display screen. The colors of the surrounding region may be collectively referred to as the first plurality of colors.

At block 406, it may be determined that the color of the IE is to be changed based on a color difference between the IE and the surrounding region. In an example, a color difference between the color of the IE, and an average color of the first plurality of colors of the surrounding region may be determined. To determine the color difference, numerical value corresponding to the color of the IE, and numerical values corresponding to the first plurality of pixels may be determined and compared. The numerical values may, for example, be determined based on definition of color in a color space, such as the RGB color space. For instance, a first value, which may correspond to the color of the IE may be determined. Further, a numerical value corresponding to each of the first plurality of pixels and an average numerical value of the first plurality of pixels may be determined. The numerical values corresponding to the surrounding region may be referred as the first plurality of numerical values. Furthermore, to determine the color difference between the IE and the surrounding region, a difference between the first numerical value and an average numerical value of the first plurality of numerical values may be determined.

In an example, the difference between the first numerical value and the average numerical value may be determined by computing a Euclidean distance between the first numerical value and the average numerical value. The Euclidean distance may be determined using the equation (1) or equation (4).

At block 408, the color of the IE may be changed in response to the determination. Accordingly, the difference between the first value and the average value may be compared with the threshold difference. For instance, if the Euclidean distance between the first numerical value and the average numerical value is lesser than the threshold difference, the color of the IE may be changed.

In an example, the color of the IE may be changed to a color of the second plurality of colors, which is supported by the display screen. For instance, numerical values corresponding to the second plurality of colors may be determined. The numerical values corresponding to the second plurality of colors may be referred to as second plurality of numerical values. A difference between the first numerical value and each of the second plurality of numerical values may be determined. To determine the difference between the first numerical value and each of the second plurality of numerical values, Euclidean distances between the first value and the second plurality of numerical values may be determined. Further, a color that has a highest Euclidean distance from the average numerical value may be selected. The selected color may be changed as the color of the IE.

Figure 5:
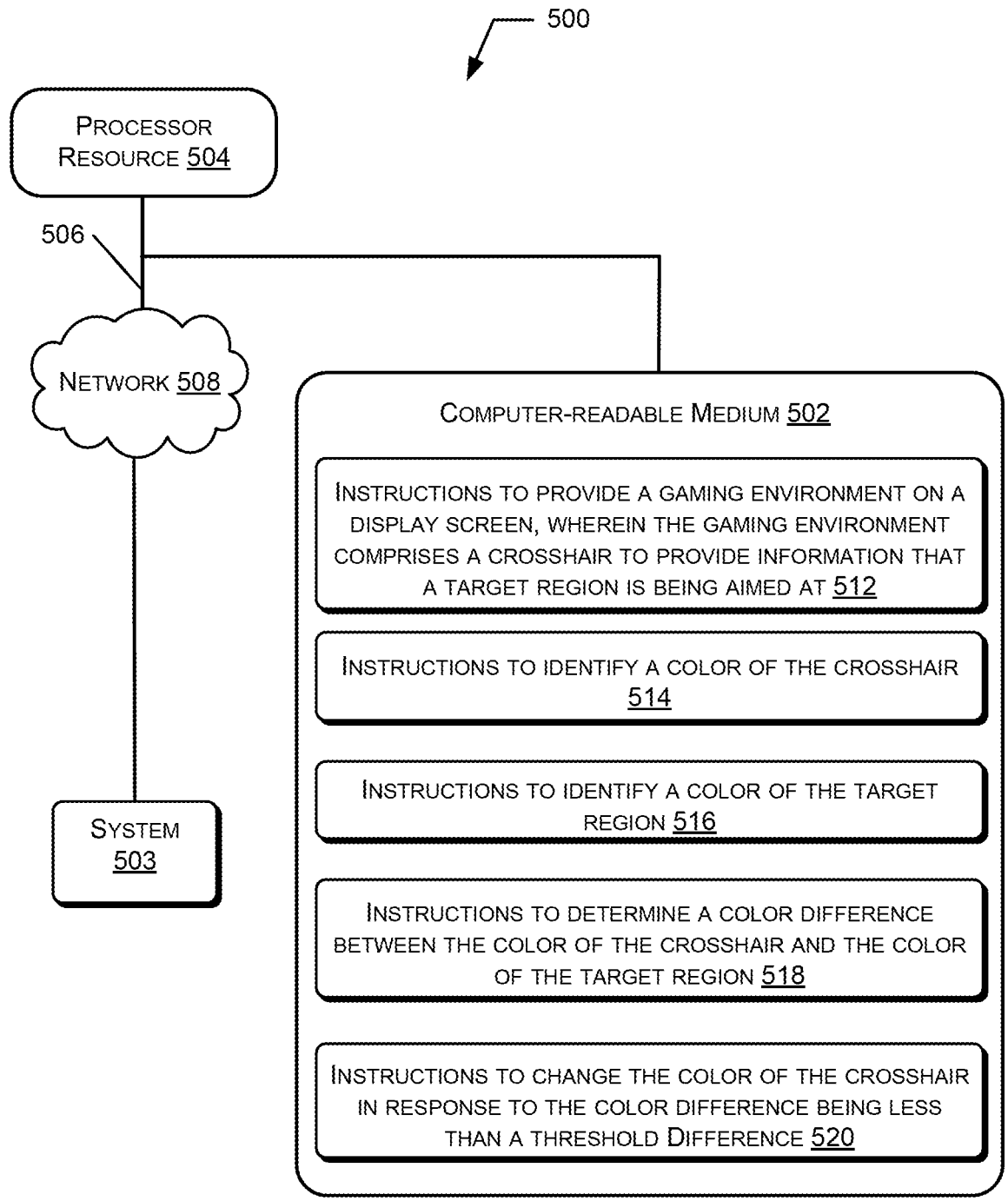
FIG. 5 illustrates a computing environment, implementing a non-transitory computer-readable medium for changing color of an IE, according to an example implementation of the present subject matter.

FIG. 5 illustrates a computing environment 500, implementing a non-transitory computer-readable medium 502 for changing a color of IE, according to an example implementation of the present subject matter.

In an example, the non-transitory computer-readable medium 502 may be utilized by the computing device 503. The computing device 503 may correspond to the system 100. The computing device 503 may be implemented in a public networking environment or a private networking environment. In an example, the computing environment 500 may include a processor resource 504 communicatively coupled to the non-transitory computer-readable medium 502 through a communication link 506.

In an example, the processor resource 504 may be implemented in a device, such as the computing device 503. The processor resource 504 may be the processor resource 104. The non-transitory computer-readable medium 502 may be, for example, an internal memory device of the computing device 503 or an external memory device. In an implementation, the communication link 506 may be a direct communication link, such as any memory read/write interface. In another implementation, the communication link 506 may be an indirect communication link, such as a network interface. In such a case, the processor resource 504 may access the non-transitory computer-readable medium 502 through a network 508. The network 508 may be a single network or a combination of multiple networks and may use a variety of different communication protocols. The processor resource 504 and the non-transitory computer-readable medium 502 may also be communicatively coupled to the computing device 503 over the network 508.

In an example implementation, the non-transitory computer-readable medium 502 includes a set of computer-readable instructions for changing color of the IE. The set of computer-readable instructions can be accessed by the processor resource 504 through the communication link 506 and subsequently executed to change color of the IE.

Referring to FIG. 5, in an example, the non-transitory computer-readable medium 502 includes instructions 512 to provide a gaming environment on a display screen. The gaming environment may correspond to the gaming environment 202, and the display screen may correspond to the display screen 102. The gaming environment may comprise a crosshair that may provide information that a target region of the gaming environment is being aimed at. For instance, a position of the crosshair may overlap with a position of the target region, and the target region may surround the crosshair. The crosshair may correspond to the crosshair 214 and the target region may correspond to the target region 218.

The non-transitory computer-readable medium 502 includes instructions 514 that causes the processor resource 504 to identify a color of the crosshair. Further, the non-transitory computer-readable medium 502 includes instructions 516 that causes the processor resource 504 to identify a color of the target region.

The non-transitory computer-readable medium 502 includes instructions 518 that causes the processor resource 504 to determine a color difference between the color of the crosshair and the color of the target region. The color difference may be determined based on a numerical value corresponding to the color of the crosshair and a numerical value corresponding to the color of the target region. The numerical value corresponding to the color of the crosshair may be referred to as the first numerical value. The first numerical value, and the numerical value corresponding to the target region may be values defined in a color space, such as an RGB color space.

In an example, to determine that color difference between the color of the crosshair and the color of the target region, a difference between the first numerical value corresponding to the color of the crosshair and the numerical value corresponding to the color of the target region may be determined.

The non-transitory computer-readable medium 502 includes instructions 520 that causes the processor resource 504 to change the color of the crosshair in response to the color difference being less than a threshold difference. For instance, if the difference between the first numerical value and the numerical value corresponding to the color of the target region is less than the threshold difference, the color of the crosshair may be changed. The color difference being less than the threshold difference indicates that the color of the crosshair is similar to that of the target region, which in turn indicates that the crosshair is not distinguishable from the target region.

In an example, the non-transitory computer-readable medium 502 includes instructions that causes the processor resource 504 to identify the surrounding region surrounding the crosshair. The surrounding region may be displayed by a plurality of pixels of the display screen. The pixels of the surrounding region may be collectively referred to as the first plurality of pixels. Each pixel of the first plurality of pixels may have a color. The colors of the surrounding region may be collectively referred to as the first plurality of colors.

Further, the non-transitory computer-readable medium 502 includes instructions that causes the processor resource 504 to determine a numerical value corresponding to each pixel of the plurality of pixels. The numerical values corresponding to the plurality of pixels of the surrounding region may be referred to as the first plurality of numerical values. The first plurality of numerical values may be values defined in the RGB color space.

The non-transitory computer-readable medium 502 includes instructions that causes the processor resource 504 to compute an average numerical value of the surrounding region based on the first plurality of numerical values. For instance, the average numerical value may correspond to an average color of the surrounding region.

The non-transitory computer-readable medium 502 includes instructions that causes the processor resource 504 to determine a difference between the first numerical value and the average numerical value and change the color of the crosshair based on the difference between the first value and the average value. For instance, if the difference is less than the threshold difference, the color of the crosshair may be changed. The present subject matter provides an efficient technique to enhance the experience of a user when interacting with virtual environments. Since the color of the IE is changed based on the color of the surrounding region, the present subject matter helps the user to continually recognize the IE, for example. The change of color of the IE based on the color of the surrounding region improves user experience in virtual environments, such as a gaming environment, where IEs, such as crosshairs, are to be moved frequently. Further, the present subject matter eliminates manual effort in changing the color of the IEs by dynamically changing the color of the IEs. For instance, the present subject matter eliminates the manual effort of changing a color of a crosshair in a gaming environment, which may have several colors, in which the IEs may be moved frequently, and in which the user may not have time to change the color of the crosshair manually.

Furthermore, inputs from the virtual environment to identify the distinguishability of the IE may not be utilized. The functions of the present subject matter may be performed by a monitor scaler of a computing device. Further, in the present subject matter, since colors of the surrounding region of an IE may be obtained from the pixels of the display screen, the virtual environments may not have to provide information of the colors of the surrounding region. Therefore, the present subject matter can be implemented with minimal changes to the virtual environment.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A system comprising:
a display screen, wherein the display screen supports a plurality of colors;
a processor resource; and
a memory resource having instructions stored thereon, wherein the instructions are executable by the processor resource to:
cause a virtual environment and an information element (IE) to present on the display screen, wherein the IE is displayed by a first pixel of the display screen and a surrounding region of the virtual environment is displayed by a plurality of pixels of the display screen and wherein the IE is to provide at least one of: information about the virtual environment and information usable by a user to interact with the virtual environment;
determine that a color of the IE is to be changed based on a color difference between the IE and the surrounding region; and
change the color of the IE in response to the determination, including to:
compute an average numerical value of a first plurality of numerical values, wherein each numerical value of the first plurality of numerical values corresponds to a pixel of the plurality of pixels,
compare a first numerical value corresponding to the color of the IE and the average numerical value,
compute a Euclidean distance between each of a second plurality of numerical values and the average numerical value, wherein the second plurality of numerical values are numerical values corresponding to the plurality of colors,
select a color from among the plurality of colors having a highest Euclidean distance from the average numerical value, and
change the color of the IE to the selected color.

2. The system of claim 1, wherein the first numerical value and the average numerical value are values in a red-blue-green (RGB) color space, wherein the first numerical value comprises a first red component, a first green component, and a first blue component, wherein the average numerical value comprises a second red component, a second green component, and a second blue component.

3. The system of claim 1, wherein the instructions are executable by the processor resource to identify the surrounding region as a region of the virtual environment displayed by a plurality of pixels within a threshold distance from a first pixel displaying the IE as the region surrounding the IE.

4. The system of claim 1, wherein the virtual environment is a gaming environment, and wherein the IE is one of: a pointer, a crosshair, and an in-game counter.

5. The system of claim 1, wherein to change the color of the IE to the selected color includes to change the color of an outline of the IE to the selected color.

6. The system of claim 1, wherein the processor resource is part of a monitor scaler of the system.

7. The system of claim 1, wherein the IE includes a plurality of IEs, wherein the processor resource is to determine that a color of each of the plurality of IEs is to be changed based on a color difference between the respective IE and the surrounding region of the respective IE.

8. The system of claim 1, wherein the virtual environment is a graphic user interface (GUI), and wherein the IE is a GUI element to interact with other elements of the GUI and overlaid on the other elements of the GUI.

9. A method comprising:
displaying an Information Element (IE) that is overlayable on a virtual environment displayed on a display screen, wherein the display screen supports a plurality of colors and wherein the IE is displayed by a first pixel of the display screen;
identifying a surrounding region that overlaps with a position of the IE, the surrounding region being part of the virtual environment, wherein the surrounding region is displayed by a plurality of pixels of the display screen;
determining that a color of the IE is to be changed based on a color difference between the IE and the surrounding region; and
changing the color of the IE in response to the determination by:
computing an average numerical value of a first plurality of numerical values, wherein each numerical value of the first plurality of numerical values corresponds to a pixel of the plurality of pixels; and
comparing a first numerical value corresponding to the color of the IE and the average numerical value;
computing a Euclidean distance between each of a second plurality of numerical values and the average numerical value, wherein the second plurality of numerical values are numerical values corresponding to the plurality of colors;
selecting a color from among the plurality of colors having a highest Euclidean distance from the average numerical value; and
changing the color of the IE to the selected color.

10. The method of claim 9, wherein identifying the surrounding region comprises:
identifying a plurality of pixels of the display screen within a threshold distance from a first pixel, wherein the first pixel is a pixel of the display screen displaying the IE; and
identifying a region displayed by the identified plurality of pixels as the surrounding region.

11. The method of claim 9, further comprising dynamically updating the surrounding region based on a change in position of the IE within the virtual environment.

12. The method of claim 9, further comprising dynamically updating the surrounding region based on a change of the virtual environment.

13. A non-transitory computer-readable medium comprising instructions, the instructions being executable by a processor resource to:
provide a gaming environment on a display screen, wherein the display screen supports a plurality of colors and wherein the gaming environment comprises a crosshair to provide information that a target region is being aimed at;
identify a color of the crosshair;
identify a surrounding region surrounding the crosshair, the surrounding region being a part of the gaming environment, the surrounding region being displayed by a plurality of pixels of the display screen;
determine a numerical value corresponding to each pixel of the plurality of pixels;
compute an average numerical value of the surrounding region based on numerical values corresponding to the plurality of pixels;

determine a difference between the average numerical value and a first numerical value corresponding to the color of the crosshair; and compute a Euclidean distance between each of a second plurality of numerical values and the average numerical value, wherein the second plurality of numerical values are numerical values corresponding to the plurality of colors, select a color from among the plurality of colors having a highest Euclidean distance from the average numerical value, and change the color of the crosshair to the selected color.

14. The non-transitory computer-readable medium of claim 13, wherein the instructions are executable by the processor resource to:

determine that the target region is being pointed at in response to a position of the crosshair overlapping with a position of the target region.

15. The non-transitory computer-readable medium of claim 13, wherein the instructions are executable by the processor resource to:

determine the numerical values corresponding to the plurality of pixels and the first numerical value in a red-blue-green (RGB) color space.

16. The non-transitory computer-readable medium of claim 13, wherein the instructions are executable by the processor resource to: identify the surrounding region as a region of the gaming environment within a threshold distance from the crosshair.

* * * * *